United States Patent Office 3,733,355
Patented May 15, 1973

3,733,355
PRODUCTION OF NITRILOTRIACETIC ACID AND THE ANALOGS THEREFOR
Edward E. Harris, Niagara Falls, and James J. Hodan, Williamsville, N.Y., assignors to Hooker Chemical Corporation, Niagara Falls, N.Y.
No Drawing. Continuation of application Ser. No. 587,970, Oct. 20, 1966. This application July 28, 1970, Ser. No. 64,097
Int. Cl. C07c 101/20
U.S. Cl. 260—534 E
11 Claims

ABSTRACT OF THE DISCLOSURE

An improved process for the production of nitrilotriacetic acid is provided. In this process e.g., metal cyanide and formaldehyde are premixed for from about 0.1 to about 100 seconds, and this premixture is then reacted with ammonia. A substantial increase in the yield of the desired product is obtained via this process.

---

This application is a continuation of Ser. No. 587,970, filed Oct. 20, 1966, now abandoned.

This invention relates to a novel process for the production of nitrilotriacetic acid and the analogs thereof.

There has been discovered an improved process for the production of nitrilotriacetic acid in high yield. In said improved process cyanide and formaldehyde are premixed, and said premixture is then added to ammonium hydroxide with which it reacts.

In accordance with this invention, there is provided a process for the production of compounds of the formulae:

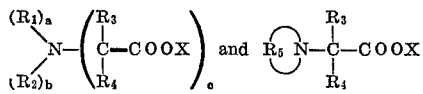

wherein $a$ is from 0 to 1, $b$ is from 0 to 1, $c$ is from 1 to 3, and the sum of $a$ plus $b$ plus $c$ is 3; wherein $R_1$, $R_2$, $R_3$, and $R_4$ are independently selected from the group consisting of:

(a) hydrogen;
(b) substituted and unsubstituted alkyl groups of 1 to 18 carbon atoms;
(c) substituted and unsubstituted alicyclic groups of 3 to 18 carbon atoms;
(d) substituted and unsubstituted aryl groups of 6 to 20 carbon atoms;
(e) substituted and unsubstituted aralkyl groups of 7 to 20 carbon atoms;
(f) substituted and unsubstituted alkyl-, alicyclic-, aryl-, and aralkyl-ketone groups wherein the hydrocarbon moiety is as hereinbefore described;
(g) substituted and unsubstituted alkyl-, alicyclic, aryl-, and aralkyl carboxylic groups wherein the hydrocarbon moiety is as hereinbefore described; and
(h) substituted aminoalkyls wherein from 1–3 groups of the formula

wherein $R_6$ and $R_7$ are selected from the group described in (a)–(g), supra, are on the alkyl radical, and wherein said aminoalkyl is of from 1 to 30 carbon atoms;

wherein X is independently selected from the group consisting of hydrogen, nitrogen bases, and a metal; and wherein $R_5$ is selected from the group consisting of alkylene of 1 to 18 carbon atoms and heteroalkylene of 1 to 18 carbon atoms wherein the hetero atom(s) are selected from the group consisting of oxygen, nitrogen, sulfur, phosphorus, silicon and boron; comprising the steps of:

(a) premixing a compound of the formula

wherein $R_3$ and $R_4$ are as hereinbefore described, with a metal cyanide; and
(b) reacting said premixture with a nitrogen compound of the formula

wherein $R_1$ and $R_2$ are as hereinbefore described.

Preferably, $R_1$, $R_2$, $R_3$, and $R_4$ will be selected from the group consisting of hydrogen and substituted and unsubstituted alkyl radicals of from 1 to 18 carbon atoms, though it is preferred that they be selected from the group consisting of hydrogen and substituted and unsubstituted alkyl radicals of from 1 to 12 carbon atoms, and it is even more preferred that they be hydrogen.

Because of the commercial importance of nitrilotriacetic acid and the salts thereof, the preferred process of this invention exists when $a$ and $b$ are 0, $c$ is 3, and $R_3$ and $R_4$ are hydrogen. When such conditions exist, i.e., when one of the compounds to be premixed is formaldehyde and when the premixture is reacted with ammonia, then salts of nitrilotriacetic acid are produced. For convenience, the following description will frequently refer to nitrilotriacetic acid as "NTA," but also pertains to other members of the class of compounds embraced in the foregoing formulae.

It has been found that premixing of the carbonyl compound and the cyanide prior to the time said reagents are added to the amine will result in a substantially greater yield of product. It has further been found that when the carbonyl compound is formaldehyde and the amine is ammonia, the best yields of product NTA are obtainable when said premixing is controlled, i.e., when the "residence time" of the cyanide and formaldehyde is 0.1 to about 100 seconds. In said case one obtains a yield of NTA which is about 20 percent greater than the yield obtainable under the same conditions without premixing.

Though the process of this invention is operable at a reaction temperature of from about zero to about 110 degrees centigrade, it is preferred to use a reaction temperature of from about 40 to 80 degrees centigrade, and a reaction temperature of from about 60 to about 70 degrees centigrade is even more preferred.

It has also been found that the yield is dependent, to some extent, on the molar ratio of cyanide to formaldehyde used. The process of said invention is useful when said ratio is from about 0.5 to about 1.5, though it is preferred to use a ratio of from about 0.9 to about 1.1, and it is even more preferred to use a ratio of about 1.0. The yield, however, is best when said ratio is from about 0.9 to about 1.1.

To some extent, the yield is dependent on the total reaction time, total reaction time being defined as the time of premixing plus the time of reaction of the premixture with the amine. The process of this invention is operable when said total reaction time is from about 0.1 hour to about 100 hours, although it is preferred to use a total reaction time of from about 0.5 hour to about 12 hours, and it is even more preferred to use a reaction time of from about two hours to about six hours. Generally, the longer the reaction time is the higher the yield is, but beyond a certain point the increase in reaction time does not result in significant increase in yield.

In the premixing process of this invention, the yield one obtains is dependent to a large extent on the "residence time" during which the cyanide and carbonyl compound are in contact with each other, "residence time" being defined as the period between the time the cyanide and carbonyl compound are premixed and the time said premixture is added to the amine. The residence time can be from about 0.1 second to about 100 seconds, although it is preferred to use residence times of about 1 to about 50 seconds, and it is even more preferred to use a residence time of from about 1 to about 20 seconds.

The yield one obtains in the premixing process of this invention is also dependent to a minor extent on the time of addition, the time it takes all of the premixture to be added to the amine. The addition time can be from about 0.1 hour to about five hours, and, generally, the longer the addition time is the higher the yield is. It is to be understood that addition time is included in calculating the total reaction time, and that both addition time and total reaction time are independent variables. In the premixing process of this invention yields of NTA greater than 90 percent are obtainable.

Generally, any compound which will provide a cyanide ion, such as metal cyanide and ammonium cyanide and the like may be used in the process of this invention.

It is preferred to use a metal cyanide in the process of this invention to furnish the cyanide ion needed in the premixture. Some suitable cyanides include lithium cyanide, sodium cyanide, ammonium cyanide, potassium cyanide, rubidium cyanide, cesium cyanide, beryllium cyanide, magnesium cyanide, calcium cyanide, strontium cyanide, barium cyanide, scandium cyanide, nickel cyanide, yttrium cyanide, chromium cyanide, ferrous cyanide, ferric cyanide, cobalt cyanide, copper cyanide, silver cyanide, zinc cyanide, cadmium cyanide, aluminum cyanide, stannous cyanide, stannic cyanide, bismuth cyanide, and the like. Alkali and alkaline earth metal cyanides are preferred, the cyanides of sodium and potassium are even more preferred, and sodium cyanide is most preferred.

Inasmuch as HCN is a very weak acid, about as weak as phenol, a metal cyanide-carbonyl compound premixture will be basic, with a pH of from about 10 to about 14.

In one preferred embodiment of the invention, sodium cyanide is used as one of the premix ingredients. One may use any concentration of the sodium cyanide provided that it is premixed with a substantially equimolar amount of carbonyl compound, although it is not economically feasible to use a very low concentration of the cyanide inasmuch as said use of a dilute cyanide solution introduces water into the reaction system which later should be removed. Obviously, the more concentrated the cyanide solution used, the less water there will be the reaction system to be removed. It is commercially unfeasible, however, to use a sodium cyanide concentration of greater than about 50 percent (percent concentration is defined by the formula:

Percent $X$ $$= \left( \frac{\text{Weight of } X}{\text{Weight of } X \text{ plus weight of solvent in which } X \text{ is dissolved and/or suspended}} \times 100 \right)$$

inasmuch as sodium cyanide is made from sodium hydroxide, and the strongest sodium hydroxide commercially available is of a concentration of 50 percent.

The carbonyl compounds which may be used in the process of this invention are of the formula

wherein $R_3$ and $R_4$ are independently selected from the group consisting of:

(a) hydrogen;
(b) substituted and unsubstituted alkyl groups of 1 to 18 carbon atoms;
(c) substituted and unsubstituted alicyclic groups of 3 to 18 carbon atoms;
(d) substituted and unsubstituted aryl groups of 6 to 20 carbon atoms;
(e) substituted and unsubstituted aralkyl groups of 7 to 20 carbon atoms;
(f) substituted and unsubstituted alkyl, alicyclic, aryl, and aralkyl ketone groups wherein the hydrogen moiety is as hereinbefore described;
(g) substituted and unsubstituted alkyl, alicyclic, aryl, and aralkyl carboxylic groups wherein the hydrocarbon moiety is as hereinbefore described;

and wherein the substituents on $R_3$ and $R_4$ may be fluorine, chlorine, bromine, iodine, nitro group(s), cyano group(s), groups of the formulae

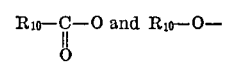

wherein $R_{10}$ may be one of the groups of from which $R_3$ and $R_4$ are selected, and the like. Some suitable carbonyl compounds are formaldehyde, acetaldehyde, propionaldehyde, butyraldehyde, benzaldehyde, nitrobenzaldehyde, tolualdehyde, phenylacetaldehyde, α-methylvaleraldehyde, β-methylvaleraldehyde, isocaproaldehyde, acetone, methyl ethyl ketone, methyl propyl ketone, ethyl ketone, benzyl methyl ketone, acetophenone, butyrophenone, benzophenone, 3-nitro-4-caproaldehyde, heptaldehyde, p-hydroxybenzaldehyde, anisaldehyde, vanillin, pipernonal, 2-pentanone, 3-pentanone, 2-hexanone, 3-hexanone, methyl isobutyl ketone, propiophenone, glyoxal, stearaldehyde, acrolein, crotonaldehyde, furfural, di-n-propyl ketone, diisopropyl ketone, di-n-amyl ketone, stearone, diacetyl, acetylacetone, mesityl oxide, phorone, cyclohexanone, and the like.

When it is desired to produce unsubstituted NTA, formaldehyde must be used as the carbonyl compound; when the premix is reacted with ammonia, a compound of the formula $N-(CH_2COOX)_3$, wherein X is a metal, will be produced.

Any concentration of carbonyl compound may be used provided that it is premixed with a substantially equimolar amount of cyanide. From 0.5–1.5 moles of carbonyl compound may be used for every mole of cyanide. Though a ratio of about 0.9–1.1 is preferred, and a 1.0 ratio is even more preferred. For the reasons hereinbefore stated, it is not economically feasible to use a very dilute concentration of the aldehyde.

It does not matter whether one used unstabilized or stabilized formaldehyde in the production of NTA (the latter has some methanol in it to preclude formation of aldehyde polymer and to prevent formaldehyde from precipitating out of solution at low temperatures); both work equally well in the process of this invention.

The premix may be added to ammonia, in which case one obtains NTA if formaldehyde was used as the carbonyl compound premixed. Alternatively, the premix may be added to a nitrogen compound of the formula

wherein $R_1$ and $R_2$ are independently selected from the group consisting of hydrogen, alkyl groups of:

(a) hydrogen;
(b) substituted and unsubstituted alkyl groups of 1 to 18 carbon atoms;
(c) substituted and unsubstituted alicyclic groups of 3 to 18 carbon atoms;

(d) substituted and unsubstituted aryl groups of 6 to 20 carbon atoms;
(e) substituted and unsubstituted aralkyl groups of 7 to 20 carbon atoms;
(f) substituted and unsubstituted alkyl, alicyclic, aryl, and aralkyl ketone groups wherein the hydrocarbon moiety is as hereinbefore described;
(g) substituted and unsubstituted alkyl, alicyclic, aryl, and aralkyl carboxylic groups wherein the hydrocarbon moiety is as hereinbefore described; and
(h) substituted aminoalkyls wherein from 1–3 groups of the formula

wherein $R_6$ and $R_7$ are selected from the group described in (a)–(g), supra, are on the alkyl radical, and wherein said aminoalkyl is of from 1 to 30 carbon atoms.

Some suitable nitrogen compounds for use in the process of this invention are methylamine, dimethylamine, aniline, N-methylaniline, morpholine, t-butylamine, methylethylamine, γ-aminobutyric acid, 2-aminoethanol, 2-(N-methylamino)heptane, 2,4,6-tribromoaniline piperazine, p-toluidine, o-toluidine, m-toluidine, diphenylamine, 4,4'-dinitrodiphenylamine, phenylazine, ethylamine, diethylamine, di-n-propylamine, isopropylamine, n-butylamine, isobutylamine, piperidine, pyrrolidine, cyclohexylamine, benzylamine, α-phenylethylamine, β-phenylethylamine, tetramethylenediamine, hexamethylenediamine, ethylenediamine, tetramethylenediamine, hexamethylenediamine, methylaniline, o-anisidine, m-anisidine, p-anisidine, o-chloroaniline, aminoacetal, m-chloroaniline, p-chloroaniline, the ortho-, meta-, and para-isomers of bromoaniline, the ortho-, meta-, and para-isomers of nitroaniline, benzhydrylamine, benzidine, the ortho-, meta-, and para-isomers of aminobenzoic acid, sulfanilamide, acetanilide, benzanilide, cyclopentylamine, aceto-o-toluidine, aceto-m-toluidide, aceto-p-toluidide, o-nitroacetanilide, diethanolamine-m-nitroacetanilide, pentamethylenediamine, p-nitroacetanilide, n-amylamine, heptadecylamine 4-aminoveratrile, 5-aminophenylacetic acid, n-hexylamine, laurylamine, allylamine, and the like.

Some preferred nitrogen compounds include ammonia, ethylenediamine, ethanolamine, methylamine, dimethylamine, morpholine, hexamethylenediamine, glycine, the salts of glycine, aminodiacetic acid, and aminoeminol.

When a monosubstituted nitrogen compound is used, and formaldehyde is used as the carbonyl compound, one obtains the salt of a diacid, of the formula

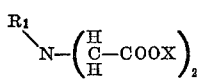

wherein X is as hereinbefore described; when a disubstituted nitrogen compound is used under the same conditions, one obtains the salt of a monoacid of the formula

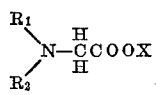

In the production of NTA itself, the formaldehyde-cyanide premix is added to ammonia. Theoretically, one mole of ammonia for every mole of NTA produced—the stoichiometric amount of ammonia—should be used. But the reaction generates ammonia, and it has been discovered that as little as 7 percent of the stoichiometric amount of ammonia may be used without harming the yields one obtains, though when one uses less than 7 percent the yields begin to suffer. It is preferred to use from 25 to 100 percent of the stoichiometric amount of ammonia. Two or three times the stoichiometric amount of ammonia may be used without adversely affecting the yields one obtains, but this practice is uneconomical, unnecessary, and does not improve said yield.

It is not known by what mechanism(s) NTA is produced in the present reactions. Some of the more probable reaction routes are proposed in Walker's book entitled, "Formaldehyde" (Rheinhold: New York, 1964) at page 242, though the inventors do not wish to be bound to any theory of reaction shown therein.

In the premixing process of this invention, it is preferred to recycle "mother liquor" which has not been converted to the desired product back to the reaction mixture inasmuch as this recycle somewhat increases the yields obtainable.

The following examples are illustrative of the invention, and are not to be deemed limitative thereof. Unless otherwise stated, parts are by weight and temperatures are in degrees centigrade.

EXAMPLE 1

A reaction vessel was charged with 30.4 parts of 28 percent ammonia and 40 parts of water, and the mixture was cooled to 5 degrees centigrade. Streams of 28 percent sodium cyanide solution and 37 percent formalin were concurrently fed into a premixer wherein said cyanide and formalin premixed, and said premixture was then continuously added to the ammonia-water mixture. The cyanide and formalin were fed into said premixer at such respective rates that molar balance between the two streams was obtained and the "residence time" of the reactants was 10 seconds. A total of 262 parts of the sodium cyanide solution and 129.3 parts of the formalin solution were added over a three-hour period, during which the temperature gradually increased to 90 degrees centigrade. The mixture was then boiled for 30 minutes, and then cooled to room temperature.

The resulting solution contained product equivalent to an 85.5 percent conversion, i.e., 85.5 percent of the cyanide charged into the reaction mixture was converted to either NTA or an intermediate. This 85.5 percent conversion of the cyanide is comparable to an 85.5 percent yield of NTA when the reaction is run continuously and NTA intermediates are fed back into the reaction system—for, in a continuous system, a steady state point is reached wherein the amount of intermediate produced by the reaction is equal to the amount of intermediate which is converted to NTA.

If ammonium cyanide is used instead of sodium cyanide, similar results are obtained.

EXAMPLE 2

The reaction mixture of Example 1 was evaporated to a thick slurry and the crystallized NTA filtered off after cooling.

The filtrate (100 parts) was charged to a reactor with 30.4 parts of ammonia and the mixture cooled to five degrees centigrade. Thereafter, the process of Example 1 was followed exactly (28 percent sodium cyanide solution and 37 percent formalin were premixed as per Example 1, the premix was added to the filtrate-ammonia mixture, etc. The conversion was 87.4 percent, and the yield of NTA was 84.5 percent.

EXAMPLE 3

The procedure of Example 1 was followed, except that there was maintained throughout the addition a slight excess (about 10 percent) of formalin. Eighty-seven percent conversion was obtained.

EXAMPLE 4

The procedure of Example 1 was repeated, except that there was maintained throughout the addition a slight (about 10 percent) excess of cyanide. Eighty-seven percent conversion was obtained.

EXAMPLE 5

The procedure of Example 1 was repeated, except that the initial reaction temperature was 20 degrees centigrade, and the reaction mixture was held at this temperature for 50 minutes during the addition by cooling before it was allowed to increase. Eighty-six percent conversion was obtained.

EXAMPLE 6

The procedure of Example 4 was followed, except that 98 parts of potassium cyanide dissolved in 188 parts of water were used instead of the sodium cyanide. 74.8 percent conversion was obtained.

EXAMPLE 7

A reactor was charged with 30.4 parts of 28 percent ammonia and 100 parts of recycle liquor from Example 4. Thereafter the procedure of Example 4 was followed, except that the initial reaction temperature was 30 degrees centigrade and the reaction mixture was held at this temperature for 70 minutes during the addition before the temperature was allowed to increase. The conversion was 86.3 percent.

EXAMPLES 8–11

A reactor was charged with 30.4 parts of 28 percent ammonia and 40 parts water. Thereafter the procedure of Example 7 was followed except that the "residence times" of the cyanide and formalin were varied. The results are tabulated below.

| Example | Residence time, seconds | Percent conversion |
|---|---|---|
| 8 | 80 | 79 |
| 9 | 20 | 86 |
| 10 | 2.2 | 87 |
| 11 | 0 | 71 |

EXAMPLE 12

Following the procedure of Example 4 on a seven-fold scale, an original and three recycle runs were made, feeding the filtrate from each run (after product removal) as charge to the next run. There was obtained from the runs an 87–88 percent yield of dried NTA.

EXAMPLES 13–16

The procedure of Example 1 was followed, except that the amount of ammonia charged into the reaction system was varied. The results are tabulated below.

| Example | Amount of ammonia used | Percent conversion |
|---|---|---|
| 13 | 100% of stoichiometric amount [1] | 85.5 |
| 14 | 50% of stoichiometric amount | 85.6 |
| 15 | 25% of stoichiometric amount | 87.5 |
| 16 | 10% of stoichiometric amount | 81.5 |

[1] 30.4 parts of 28 percent ammonia.

EXAMPLE 17

A reactor was charged with 100 parts of recycle liquor from Example 4. Ammonia gas was bubbled into the liquor until 4.5 parts was absorbed. Thereafter the procedure of Example 4 was followed except that the initial reaction temperature was 60 degrees centigrade and the reaction mixture was held at this temperature for 130 minutes before it was allowed to rise. A conversion of 87.9 percent was obtained.

EXAMPLE 18

The procedure of Example 4 was followed except that the premixture was cooled to less than 15 degrees centigrade before it was added to the ammonia. The initial reaction temperature was 60 degrees centigrade and the reaction mixture was held at this temperature for 130 minutes before it was allowed to rise. A conversion of 85 percent was obtained.

EXAMPLES 19–20

The procedure of Example 4 was followed, but the temperature of the reaction mixture was maintained at 80 degrees centigrade. When the addition time was 60 minutes a conversion of 72 percent was obtained; when the addition time was 180 minutes a conversion of 83 percent was obtained.

EXAMPLES 21–22

The procedure of Example 4 was followed, but the temperature of the reaction mixture was maintained at 70 degrees centigrade. When the addition time was 90 minutes a conversion of 84 percent was obtained; when the addition time was 150 minutes a conversion of 89 percent was obtained.

EXAMPLE 23

The procedure of Example 1 was followed, but 1.5 moles of morpholine were used rather than 0.5 mole of ammonia. After the reaction mixture was boiled as per Example 1, it was stripped of water and dried by azeotroping with benzene. The residual solid was slurried with methanol, filtered, and dried to yield 90 percent sodium alpha-morpholinoacetate, with a melting point in excess of 250 degrees centigrade. When alkyl amines of 1–18 carbon atoms and aryl amines of 6–20 carbon atoms are used instead of ammonia, similar results are obtained.

EXAMPLE 24

The procedure of Example 23 was followed, but 1 mole of aniline was used rather than morpholine. The product had a theoretical nitrogen content of 5.5 percent. Elemental analysis revealed a nitrogen content of 5.4 percent. The yield was 88.4 percent.

Similar results were obtained using 67.5 parts of dimethylamine and 22.5 parts of ethylenediamine instead of aniline. In the former experiment, nitrogen titration revealed that the product obtained had a purity of 95–96 percent (i.e., 95–96 percent of the nitrogen theoretically present in a pure product was found to be present in the product.).

EXAMPLE 25

The procedure of Examples 21–22 was followed, except that the premix "residence time" was cut in half. With a 130-minute addition time a conversion of 91.3 percent was obtained.

Various changes and modifications may be made in the method of this invention, certain preferred forms of which have been described, and equivalents may be substituted without departing from the spirit and scope of this invention.

What is claimed is:

1. A process for producing a compound of the formula $N(CH_2CCOOX)_3$ wherein X is ammonium, an alkali metal or an alkaline earth metal comprising the steps,
    (a) premixing a cyanide selected from the group consisting of ammonium cyanide, alkali metal cyanides and alkaline earth metal cyanides, and formaldehyde for a period of from about 0.1 second to about 100 seconds;
    (b) reacting said premixture with ammonia at a temperature of from about 0 to about 110 degrees centigrade for a period of time of from about 0.5 to about 12 hours.

2. The process of claim 1 wherein the cyanide is an alkali metal cyanide and X is an alkali metal.

3. The process of claim 2 wherein the premixing is for a period of time from about 2.2 to about 80 seconds.

4. The process of claim 2 wherein the premixing is for a period of time of from about 1 to about 50 seconds.

5. The process of claim 2 wherein the molar ratio of metal cyanide to formaldehyde used is from about 0.5 to about 1.5.

6. The process of claim 2 wherein the premixture is reacted with ammonia at a temperature of from about 40 to about 100 degrees centigrade for a period of time of from about 2 to about 6 hours.

7. The process of claim 2 wherein the premixture is reacted with ammonia at a temperature of from about 60 to about 70 degrees centigrade.

8. The process of claim 2 wherein the metal cyanide is sodium cyanide.

9. The process of claim 8 wherein the molar ratio of sodium cyanide to formaldehyde is about 1.

10. The process of claim 2 wherein
   (a) the metal cyanide and formaldehyde are continuously premixed, and the premixture is continuously added to the ammonia; and
   (b) during said addition the product is continuously removed from the reaction mixture.

11. The process of claim 2 wherein the pH of the premixture is from about 10 to about 14.

References Cited

UNITED STATES PATENTS

| | | | |
|---|---|---|---|
| 2,387,735 | 10/1945 | Bersworth | 260—534 |
| 2,500,019 | 3/1950 | Bersworth | 260—534 |
| 2,631,165 | 3/1953 | Plogtz | 260—534 |

HENRY R. JILES, Primary Examiner

P. J. KILLOS, Assistant Examiner

U.S. Cl. X.R.

260—243 B, 247.2 R, 268 R, 293.72, 293.88, 326.3, 514 R, 518 R